United States Patent [19]
Bathelt

[11] 4,232,756
[45] Nov. 11, 1980

[54] MOTOR-VEHICLE DRIVE-SHAFT ASSEMBLY

[75] Inventor: Hartmut Bathelt, Lenting, Fed. Rep. of Germany

[73] Assignee: Audi NSU Auto Union Aktiengesellschaft, Neckarsulm, Fed. Rep. of Germany

[21] Appl. No.: 915,605

[22] Filed: Jun. 15, 1978

[30] Foreign Application Priority Data

Jun. 22, 1977 [DE] Fed. Rep. of Germany ....... 2727966

[51] Int. Cl.³ .......................................... B60K 17/22
[52] U.S. Cl. .................................. 180/70 P; 64/11 B
[58] Field of Search ............... 180/70 P, 73 R, 43 R; 64/11 B

[56] References Cited

U.S. PATENT DOCUMENTS 2,831,545  4/1958  Christiano .................... 180/73 R
3,754,411  8/1973  Orain ............................ 64/11 B

FOREIGN PATENT DOCUMENTS 1286831  1/1969  Fed. Rep. of Germany .......... 64/11 B
2156783  5/1973  Fed. Rep. of Germany ......... 180/70 P

*Primary Examiner*—John J. Love
*Assistant Examiner*—Randall A. Schrecengost
*Attorney, Agent, or Firm*—Karl F. Ross

[57] ABSTRACT

A drive shaft of a motor vehicle has a pair of coaxial input and output shaft stubs having their confronting ends provided with radially outwardly extending flanges. A circumferentially corrugated sheet-steel tube of substantially greater diameter than the shaft stubs connects the outer peripheries of these flanges together. Thus the tube transmits torque between the two stub shafts but nonetheless allows limited relative radial and axial displacement therebetween to prevent vibration transmission.

7 Claims, 1 Drawing Figure

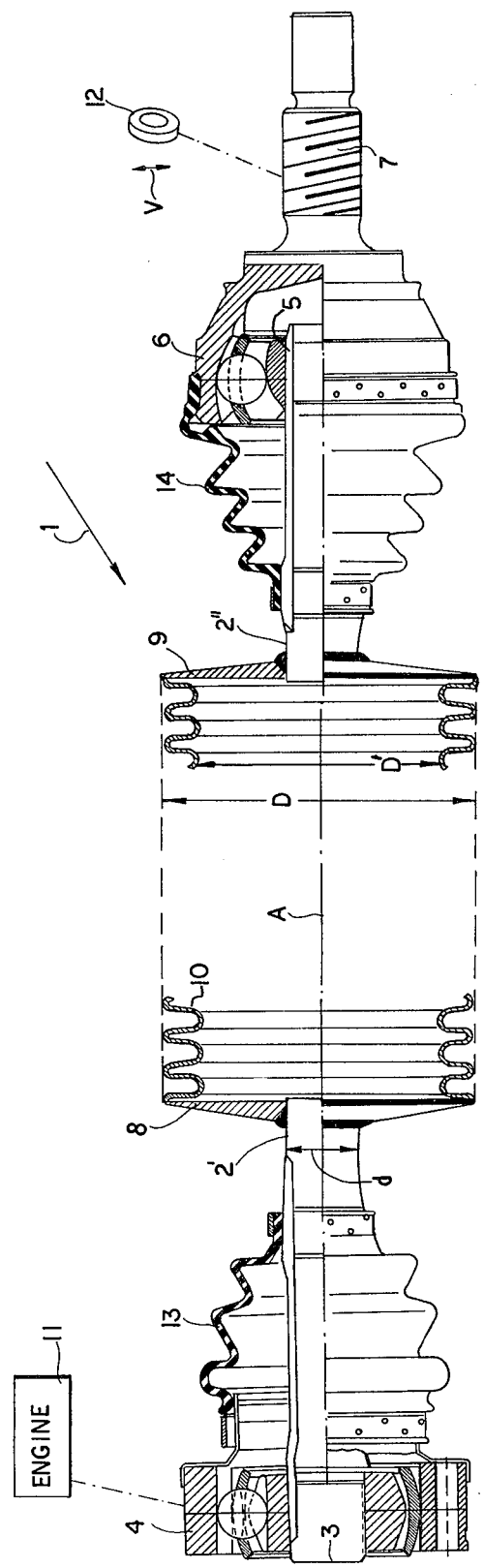

MOTOR-VEHICLE DRIVE-SHAFT ASSEMBLY

FIELD OF THE INVENTION

The present invention relates to a shaft assembly for a motor vehicle. More particularly this invention concerns such an assembly usable to connect the transmission or differential of a motor vehicle to a wheel thereof.

BACKGROUND OF THE INVENTION

The torque from the engine of a motor vehicle is transmitted via a main drive shaft normally including one or more flexible couplings or universal joints to a differential from which the power is fed through a pair of wheel drive-shafts to the motor-vehicle wheels. A transmission is provided normally at the output of the engine or even immediately upstream of the differential.

The problem with such drive systems is that vibrations in the audio range are transmitted along the drive system to the vehicle wheels, and thence through the suspension for these wheels to the body of vehicle. As a result the noise level inside the vehicle is increased considerably. Such transmission of vibriations is aggravated by the so-called bending resonance of the torque-transmission elements.

Systems, such as seen in German Patent Publication No. 2,156,783, have been designed for allowing the drive-shaft assembly to absorb axial stresses through plastic deformation of an element, but these arrangements still do not in any manner damp vibrations through the system. Other arrangements are known which incorporate elastic elements into the force-transmission path between the engine and the wheels. All these systems normally result in some loss of torque and have a relative short service life. In fact the amount of vibrations transmitted is normally inversely proportional to the amount of torsional energy that is lost in such systems.

OBJECTS OF THE INVENTION

It is therefore an object of this invention to provide an improved drive-shaft assembly.

Another object is to provide such an assembly which transmits minimal vibration, yet wherein the torque loss is minimized.

Another object is to provide such an assembly which can be produced at relatively low cost and which will have a long service life.

SUMMARY OF THE INVENTION

These objects are attained according to the instant invention in a shaft assembly having relatively small-diameter input and output shafts which lie generally on the same axis and have their one ends connected respectively to the engine and the load. The other ends of these shafts are provided with respective rigid input and output flanges which extend radially outwardly from the shafts. A large-diameter torque-transmitting tube centered generally on the axes of the shafts has axially spaced input and output ends respectively fixed to the input and output flanges. This tube is elastically radially and axially deformable but its input and output ends are relatively angularly nondisplaceable. Thus torque transmission through this tube is excellent while the radially and axially effective vibrational energy is not transmitted through the tube.

It has been suprisingly even found according to the instant invention that it is possible to use an elastically deformable sheet-metal tube, normally formed with circumferential corrugations, as a force-transmitting member. Even the relatively heavy loads encountered in a motor-vehicle drive system can easily be transmitted by such tubes. Thus virtually no energy is lost while at the same time the overall noise level can be greatly reduced.

The tube in fact constitutes for the audio-frequency vibrations a dead end. At the same time its relatively large diameter ensures that, even though its mass is reduced, the force of transmission can remain relatively great. In accordance with this invention the overall maximum diameter of the tube is at least three times that of the shafts it is interconnecting. Since the torque-transmitting capacity of a thin-walled axially symmetrical closed tube is a function of the square of the radius of the tube, such a large-diameter tube can easily transmit the same amount of torque as a standard small-diameter solid or tubular shaft.

BRIEF DESCRIPTION OF THE DRAWING

The sole FIGURE of the drawing is a side view partly in axial section through a shaft assembly according to the instant invention.

SPECIFIC DESCRIPTION

A shaft assembly 1 according to this invention is adapted to be connected between a motor-vehicle engine 11 and a motor-vehicle wheel 12. The wheel 12 is supported on the motor-vehicle for vertical displacement as indicated by double-headed arrow V. The engine 11 in fact is connected to the shaft assembly 1 through a transmission and a differential.

The assembly 1 has a pair of like stubshafts 2' and 2". The former has an input end 3 connected to the inner race of a Bendix-Weiss rolling-ball universal joint whose outer race 4 is connected to the engine 11 via the differential. Thus this stubshaft 2', which is surrounded by a cuff 13 connected to the member 4, will rotate about an axis A of the system with limited angular offset possible between the shaft 2' and the rotation axis of the outer member 4. Similarly the output member 2" has an output end 5 connected to the inner race of another rolling-ball universal joint having an outer member 6 in turn connected to a stub 7 carrying the drum for the wheel 12. Another cuff 14 is connected between this outer race 6 and the stubshaft 2".

The shafts 2' and 2" are normally coaxial and are welded at their confronting inner ends to circularly annular disks 8 and 9 which taper radially outwardly and define an outer diameter D here equal to approximately four times the diameter d of the shafts 2' and 2". The circular outer peripheries of the flanges 8 and 9 are welded to the ends of a corrugated sheet-steel tube 10 centered on the axis A like the shafts 2' and 2". The corrugations of the tube 10 have a depth equal to less than the diameter d, and are so dimensioned that this tube 10 can allow sufficient axial displacement between the flanges 8 and 9 as well as radial displacement to prevent vibration transmission between the shafts 2' and 2". Thus the inner diameter D' of the tube 10 is equal to about three times the diameter d, and at least twice this dimension.

At the same time the very thin walls of the corrugated tube 10 will allow excellent force transmission between the shafts 2' and 2" angularly of the axis A.

Thus whatever vibrations are present in the drive system up to the flange 8 will not be transmitted through the tube 10 to the wheel 12 and then through the suspension to the motor-vehicle carriage. Since most of the drive system is normally supported on elastic bumpers and the like within the vehicle this will greatly reduce the interior noise level in the vehicle.

I claim:

1. A shaft assembly for interconnecting an engine and a load, said assembly comprising:
   a small-diameter input shaft lying generally on an axis and having a pair of ends one of which is adapted to be connected to said engine and the other of which has a predetermined shaft diameter;
   a small-diameter output shaft lying generally on said axis and having a pair of ends one of which is adapted to be connected to said load and the other of which has a predetermined shaft diameter;
   respective rigid and radially outwardly tapering input and output flanges fixed on the other ends of said input and output shafts and extending radially outwardly therefrom; and
   a large-diameter torque-transmitting and circumferentially corrugated tube centered generally on said axis and having axially spaced input and output ends respectively fixed to said input and output flanges, said tube being elastically radially and axially deformable but said input and output ends being relatively angularly nondisplaceable, said tube having an inner diameter equal to at least twice either of said shaft diameters and an outer diameter equal to at least three times either of said shaft diameters.

2. The assembly defined in claim 1 wherein said tube is of sheet metal.

3. The assembly defined in claim 2 wherein said flanges have generally circular outer peripheries centered on said axis and to which said tube is secured.

4. The assembly defined in claim 1 wherein said tube is of steel.

5. The assembly defined in claim 1 wherein each of said shafts carries at its said one end a torque-transmitting flexible coupling.

6. The assembly defined in claim 5 wherein said flexible coupling of said output shaft is adapted to be secured to a motor-vehicle wheel.

7. The assembly defined in claim 6 wherein said flexible coupling of said input shaft is adapted to be secured to a motor-vehicle differential.

* * * * *